United States Patent [19]

Revelli, Jr.

[11] Patent Number: 5,390,157
[45] Date of Patent: Feb. 14, 1995

[54] WAVEGUIDE OPTICAL PICK-UP HEAD USING MACH-ZEHNDER INTERFEROMETER WAVEFRONT SENSOR APPARATUS AND METHOD

[75] Inventor: Joseph F. Revelli, Jr., Rochester, N.Y.

[73] Assignee: Eastman Kodak Company, Rochester, N.Y.

[21] Appl. No.: 913,579

[22] Filed: Jul. 15, 1992

[51] Int. Cl.⁶ .............................................. G11B 7/135
[52] U.S. Cl. .................. 369/44.12; 369/112; 385/14
[58] Field of Search ............... 369/44.12, 44.11, 44.23, 369/112; 385/14, 3, 132; 250/201.5

[56] References Cited

U.S. PATENT DOCUMENTS

| | | | |
|---|---|---|---|
| 4,991,60 | 2/1991 | Premji | 369/44.12 |
| 4,431,263 | 2/1984 | Garito . | |
| 4,478,483 | 10/1984 | Sprague . | |
| 4,672,187 | 6/1987 | Fujita et al. | 250/201.5 |
| 4,775,215 | 10/1988 | Teng et al. | 385/143 |
| 4,792,208 | 12/1988 | Ulman et al. . | |
| 4,798,437 | 1/1989 | Rediker et al. . | |
| 4,878,723 | 11/1989 | Chen et al. . | |
| 4,878,724 | 11/1989 | Thaniyavarn . | |
| 4,946,235 | 8/1990 | Scozzafava et al. . | |
| 4,948,225 | 8/1990 | Rider et al. . | |
| 4,955,977 | 9/1990 | Dao et al. . | |
| 4,971,426 | 11/1990 | Schildkraut et al. . | |
| 5,039,186 | 8/1991 | Man et al. | 385/130 X |
| 5,093,883 | 3/1992 | Yoon et al. | 385/130 |
| 5,155,791 | 10/1992 | Hsiung | 385/122 |
| 5,218,584 | 6/1993 | Gfeller | 369/44.23 X |

FOREIGN PATENT DOCUMENTS

| | | |
|---|---|---|
| 0174008 | 3/1986 | European Pat. Off. . |
| 3534776 | 9/1985 | Germany . |
| 3536497 | 10/1985 | Germany . |
| 60-263350 | 12/1985 | Japan . |
| 61-294646 | 12/1986 | Japan . |

OTHER PUBLICATIONS

Shogo Ura et al., *An Integrated-Optic Disk Picup Device*, IEEE J. Lightwave Technology, vol. LT-4, No. 7, pp. 913–918, Jul. 1986.

Suhura and Nishihara, *Integrated Optics Components and Devices Using Periodic Structures*, IEEE J. Quantum Electronics, vol. QE-22, No. 6, pp. 845–867, Jun. 1986.

*Primary Examiner*—Aristotelis Psitos
*Assistant Examiner*—Duncan Wilkinson
*Attorney, Agent, or Firm*—Raymond L. Owens

[57] ABSTRACT

An integrated optic head contains a planar and a channel waveguide, a waveguide condensing lens, and integrated waveguide photodetectors. The main portion of the beam returning from the disk is focused by the lens onto an integrated waveguide photodetector to provide the data signal. A smaller portion of the beam is sampled by channel waveguide Mach-Zehnder (MZ) interferometers that measure the beam wavefront curvature to provide the focus error signal (FES). Additional channel waveguides provide reference signals for the interferometers and provide a means of measuring the tracking error signal (TES). The TES method includes subtracting light detected by one channel waveguide detector from light detected by another, which difference is the tracking error. The FES method includes obtaining the difference in the ratios of the light emanating from two interferometers divided by the light emanating from their respective channel waveguides, which difference in ratios is the focus error.

9 Claims, 8 Drawing Sheets

WAVEGUIDE OPTICAL PICK-UP HEAD USING MACH-ZEHNDER INTERFEROMETER WAVEFRONT SENSOR APPARATUS AND METHOD

TECHNICAL FIELD OF THE INVENTION

The present invention relates generally to an Integrated Guided Wave Optical Head (IGWOH) for reading information from optical data storage disks. More specifically, it relates to an integrated optical head that uses Mach-Zehnder interferometer wavefront sensor apparatus to determine focus and tracking errors and a method for detecting the errors.

BACKGROUND ART

An optical head, whether of the bulk or integrated optic variety, must provide at least three separate functions. First of all, it must retrieve the data signal encoded on the light reflected off of the optical disk. Second, it must measure tracking errors, which are displacement errors associated with motion of the disk in the plane of the disk. Finally, it must measure focus errors, which are displacement errors associated with motion of the disk in a direction perpendicular to the plane of the disk. Integrated Guided Wave Optical Heads (IGWOH) represent compact, low mass alternatives to bulk optical head assemblies for reading information from an optical data storage disks.

Current integrated optical head designs such as the one proposed by Ura et al. in *An Integrated-Optic Disk Pickup Device*, Journal of Lightwave Technology, Vol. LT-4, No. 7, July 1986 employ conventional techniques such as the "push-pull" method for monitoring the tracking error signal (TES) and the "pupil obscuration" method for monitoring the focus error signal (FES). (See, for example, "Principles of Optical Disk Systems", G. Bouwhuis et al., Adam Hilger Ltd., Boston, 1985.) These methods are adapted to optical waveguides using grating lenses and beam splitters to replace the bulk optical components. Unfortunately, these methods require high performance lenses (i.e., lenses with large numerical apertures and large Strehl ratios) which are extremely difficult to fabricate in waveguides. Furthermore, the fabrication techniques required for these lenses are not readily adaptable to mass production.

U.S. Pat. No. 4,798,437 discloses a method and apparatus for processing analog optical wave signals using Mach-Zehnder (MZ) interferometer arrays formed on inorganic electro-optic substrates, such as LiNbO3 for example, to analyze wavefront profiles. Among the devices mentioned is an integrated optical waveguide range finder wherein free space radiation from a point source is end-fire coupled into an array of channel waveguides. The distance of the point source from the analyzer determines the curvature of the wavefront incident on the analyzer. Portions of the wavefront falling on adjacent channel waveguides are shifted slightly in phase due to this curvature. Adjacent channels are joined together at a Y-junction and the relative phase shift results in interference between light from these two channels. The signal exiting the interferometer, when taken together with the signals from other interferometers in the array, provide a measure of the wavefront curvature and hence of the distance to the source. Other light signals provide intensity reference levels. Control electrodes permit electro-optical phase-shifting of one channel with respect to the other. This feature provides a means for compensating for slight differences in the optical path lengths of the two channels or of biasing one channel with respect to the other.

Even though channel waveguide MZ interferometry has been used to sense wavefront curvature, it has not been used to measure the focus error signal in an integrated optic head. Further, prior art interferometer arrays are based upon waveguides formed by indiffusion in LiNbO3 or other similar inorganic electro-optic single crystals. Accordingly, it will be appreciated that it would be highly desirable to use newer technology and have waveguides formed from new thin-film electro-optic polymers deposited on silicon substrates and to integrate electronic functions such as photodetection, amplification, and switching with the optic functions.

SUMMARY OF THE INVENTION

The present invention is directed to overcoming one or more of the problems set forth above. Briefly summarized, according to one aspect of the present invention, the methods for determining focus and tracking errors in an integrated optical head that has an optical axis and is capable of reading from an optical data storage disk comprises several steps common to both focus and error tracking. The common steps include forming optical waveguide channels in the integrated guided wave optical head (IGWOH) and forming first and second interferometers, detecting light emanating from the first and second interferometers, detecting light emanating from a first channel waveguide associated with the first interferometer, and detecting light emanating from a second channel waveguide associated with the second interferometer. For determining tracking error, the method includes subtracting a signal detected by the first channel waveguide light detector from signal detected by the second channel waveguide light detector. For determining focus error, the method includes obtaining the difference in the ratios of the light emanating from the first and second interferometers divided by the light emanating from the respective first and second channel waveguides.

According to another aspect of the invention, an IGWOH having an optical axis and capable of reading from an optical data storage disk comprises optical waveguide channels formed in the IGWOH forming first and second interferometers and first and second channel waveguides associated with the respective first and second interferometers. First and second waveguide channel detectors are positioned to detect light emanating from the respective first and second channel waveguides. Additional channel waveguide detectors are positioned to detect light emanating from the respective first and second interferometers. A single waveguide condensing lens is positioned along the optical axis of the optical head and a condensing lens detector detects light emanating from the condensing lens.

The present invention is a novel integrated optic head comprised of a planar waveguide, channel waveguides, a waveguide condensing lens, and integrated waveguide photodetectors. The beam returning from the disk is coupled into a planar optical waveguide by a grating coupler. The main portion of this beam is focused by a waveguide condensing lens onto an integrated waveguide photodetector to provide the data signal. A smaller portion of the beam is sampled by channel waveguide MZ interferometers. These interferometers measure the beam wavefront curvature to provide the focus error signal (FES). Additional channel waveguides provide reference signals for the interferometers and provide a means of measuring the tracking error signal (TES).

A significant advantage of the integrated optic head of the present invention is its tolerance to fabrication errors. The condensing lens is the only waveguide lens required. The alignment and quality of the waveguide lens can be relatively coarse compared to the lens quality and alignment requirements of other prior art integrated optical heads. In addition, the channel waveguides that constitute the MZ interferometers can be electro-optically tuned after fabrication. The net result is that the integrated optic head is far more easily mass manufactured because of its reduced sensitivity to fabrication error.

Although the use of channel waveguide MZ interferometry to sense wavefront curvature has been previously disclosed, application of the technique to measure the focus and tracking error signals in an IGWOH is new. The present invention obtains a focus error signal by subtracting signals from two properly positioned and biased interferometers. The current invention includes waveguides formed from new thin-film electro-optic polymers deposited on silicon substrates. This feature allows for the custom integration of electronic functions such as photodetection, amplification, and switching with the optic functions.

DETAILED DESCRIPTION OF THE PREFERRED EMBODIMENTS

Figure 1:
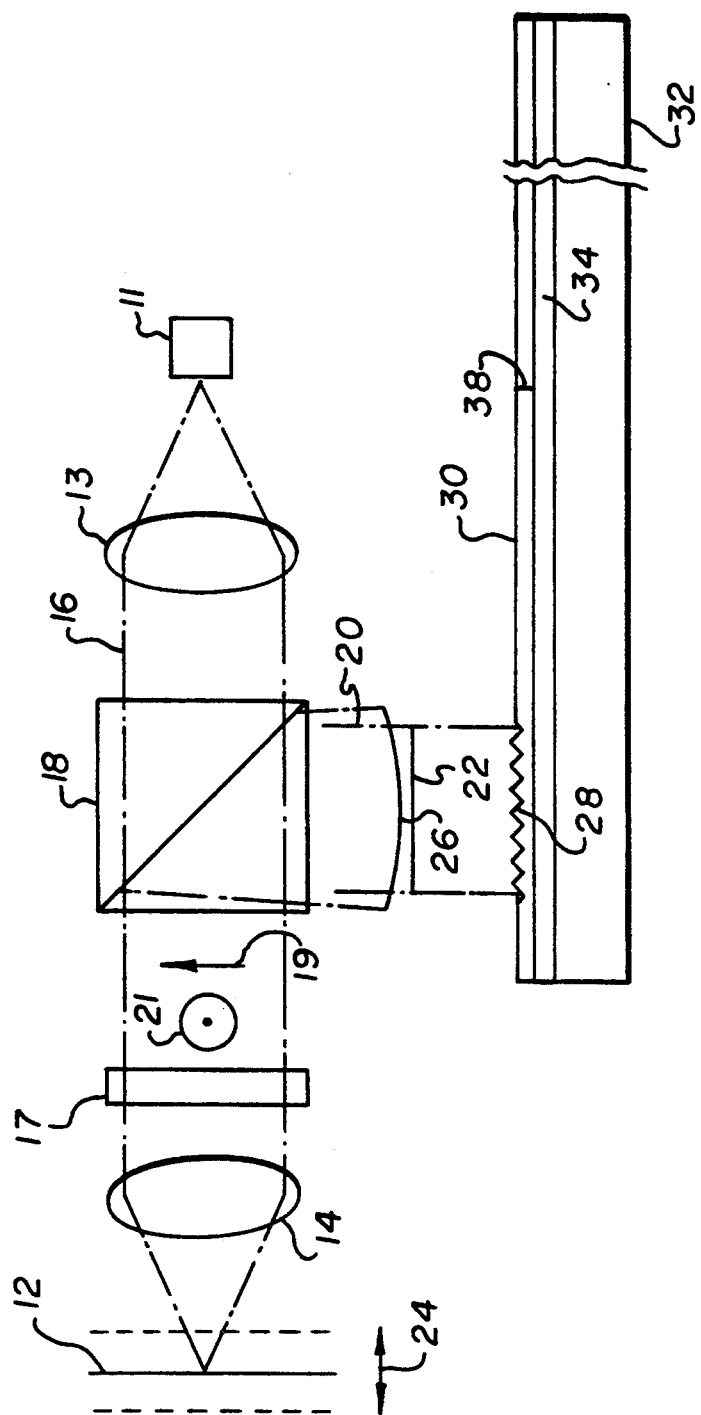
FIG. 1 is a diagrammatic side view of a preferred embodiment of a waveguide pickup head using a polarization beam splitter and quarter-wave plate, laser diode, optical disk and objective lens in accordance with the present invention.
Figure 2:
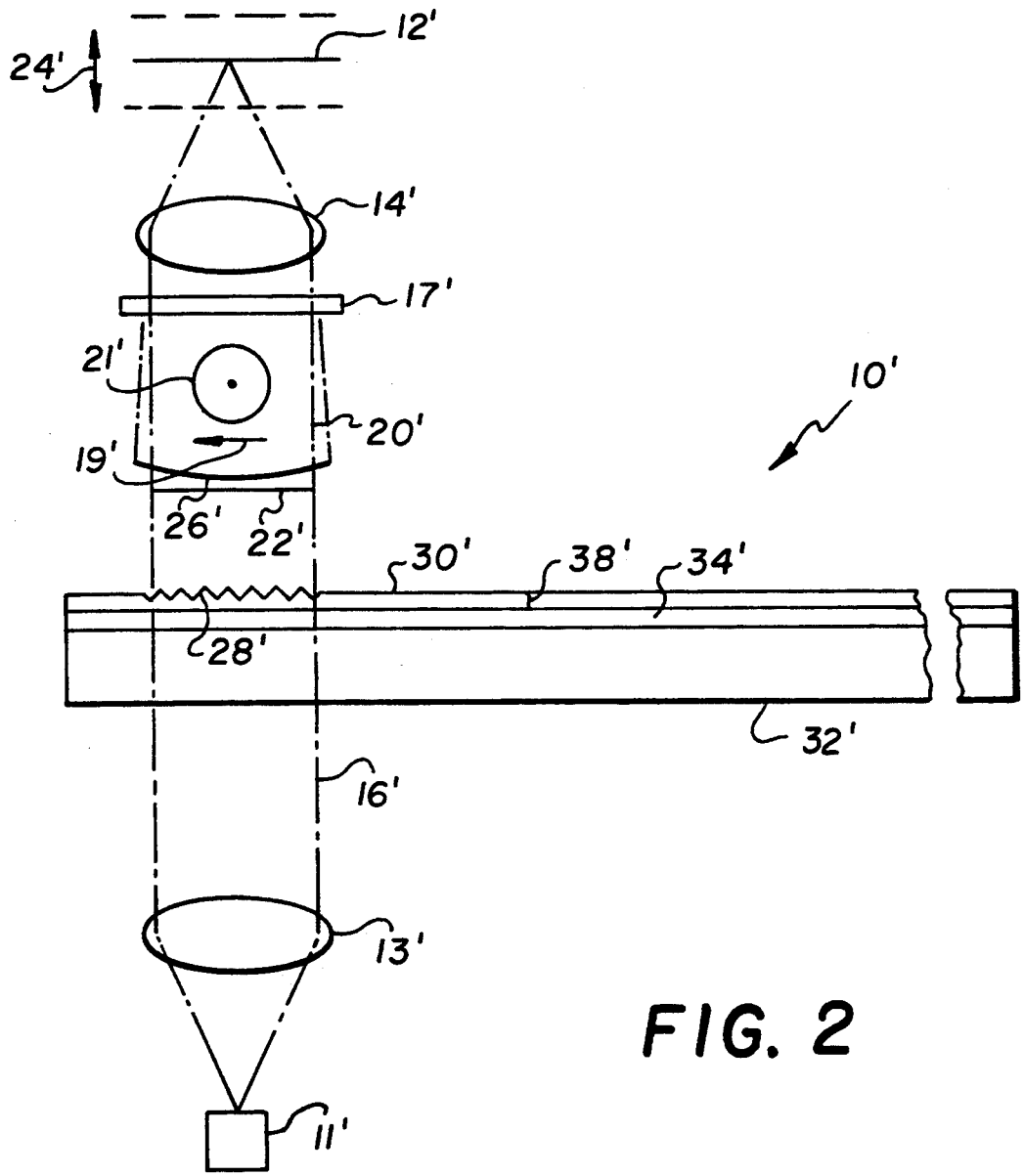
FIG. 2 is a diagrammatic side view similar to FIG. 1, but illustrating another preferred embodiment of a waveguide pickup head using a polarizer and polarization sensitive coupling grating, a laser diode, optical disk, and objective lens in accordance with the present invention.

Referring to the drawings, FIGS. 1 and 2 illustrate a waveguide optical pick-up head 10. FIGS. 1 and 2 are side views of the waveguide pick-up head 10 along with the optical disk 12 and objective lens 14.

Referring to FIG. 1, a beam of light from laser diode 11 is converted to collimated beam 16 by collimating lens 13. The polarization beam splitter 18 reflects S-polarized light and transmits P-polarized light so that the linear polarization state of light incident on quarter-wave plate 17 is as shown by 19. The quarter-wave plate 17 changes the linearly polarized light to circularly polarized light and this beam is focused by means of objective lens 14 onto the information bearing surface of the optical disk 12. Upon reflection from the surface of the optical disk 12, the intensity of the light is modulated according to the information recorded thereon. The light is recollimated by objective lens 14 provided the disk surface 12 and the objective lens 14 are separated by a distance equal to the focal length of the objective lens 14. This collimated light is converted from circularly polarized light to linear polarized light which is rotated 90 degrees relative to the polarization state 19 as indicated by 21. Polarization state 21 is totally reflected from polarization beam splitter 18 because it is S-polarized. Beam 20 is then incident on the grating 28 and is coupled into the waveguide 30 as TE polarized light. The purpose of the quarter-wave plate and polarization beam splitter is to ensure optical isolation of the laser diode 11; that is, to ensure that none of the light reflected from the optical disk surface 12 returns to the laser diode 11. This means of isolation is well-known in the art and it serves not only to prevent laser diode feedback noise but also to maximize the amount of light available to be detected as signal. TM-polarized light can be coupled into waveguide 30 by grating coupler 28 instead of TE-polarized light by slightly rearranging the elements shown in FIG. 1. For example, laser diode 11 must be oriented so that S-polarized light is incident on polarization beam splitter 18. Optical disk 12, objective lens 14 and quarter-wave plate 17 must be positioned on the upper side of polarization beam splitter 18; that is, on the opposite side of polarization beam splitter 18 from the waveguide device 10.

An alternative means of achieving optical isolation is shown in FIG. 2. The means does not require a polarization beam splitter, however it does require a specially designed coupling grating 28'. Light polarized along direction 19' from laser diode 11' is converted to collimated beam 16' by collimating lens 13'. Grating 28' is designed so that it transmits TM-polarized light and couples TE-polarized light into the waveguide device 10'. Thus, polarization state 19' is transmitted by grating 28'. In a fashion similar to the one described for the above-mentioned isolator, light reflected from the information-bearing surface of the optical disk 12' through the quarter-wave plate 17' is linearly polarized but in a direction 21' that is 90 degrees to the polarization state 19'. Beam 20' is now incident on the grating coupler 28' with TE polarization and is coupled into the waveguide device 10' by means of grating coupler 28'. In the embodiment shown in FIG. 2, substrate 32' must be transparent to the beam 16' in the vicinity of the grating 28'. It will also be appreciated that the grating 28' can be made so that it transmits TE-polarized light and couples TM-polarized light. In this case, laser diode 11' is oriented so that light polarized along direction 21' is incident on quarter-wave plate 17' and light polarized along direction 19' is coupled into planar waveguide 30' by grating 28'.

Referring to both FIGS. 1 and 2, elements with the same reference number are referred to without the "'" for simplicity. Beam 20 is characterized by planar wavefronts 22 when it is collimated. Relative movement (indicated by arrow 24) of the disk surface 12 from this nominal position (i.e., defocus) results in decollimation of beam 20 and curved wavefronts 26. Beam 20 is coupled by means of grating 28 into a planar optical waveguide 30.

The planar waveguide 30 is thin enough for single mode operation at the wavelength of light employed. Typically, this would require 0.5 to 2 $\mu$m film thickness. This film can be composed of any of a number of transparent, high refractive index, materials, such as, for example, RF sputtered Corning 7059 glass, ion-exchanged BK7 glass, chemical vapor deposited (CVD) $SiO_xN_y$, or even organic films such as spin-coated non-linear optic azo-benzene sulfone dye co-polymer, PMMA (polymethylmetacrylate), or evaporated organic monomer glasses. This waveguide material is deposited on top of a transparent buffer layer 34 of low refractive index. Thin films 30 and 34 are supported by substrate 32.

If silicon is chosen as the substrate 32, a sputtered or thermally-grown layer of $SiO_2$, 1 to 3 $\mu$m in thickness, must be deposited directly on the silicon to serve as a transparent, low refractive index buffer layer 34. The silicon substrate 32 permits custom electronic functions such as detectors, amplifiers, transistors, etc. to be fabricated monolithically on the same substrate as the optical functions. Photodetectors which have been integrated with optical waveguides on silicon substrates are known in prior art. See German Patent DE 35 36 497 A1, U.S. Pat. No. 4,672,187, and German Patent DE 35 34 776 A1. Alternatively, buffer layer 34 can be omitted and the substrate 32 and waveguide 30 can be formed by indiffusion of titanium into a planar slab of electro-optic $LiNbO_3$. The materials specified for the various layers are by no means meant to be exclusive. Other materials with similar properties can also be used.

Figure 3:
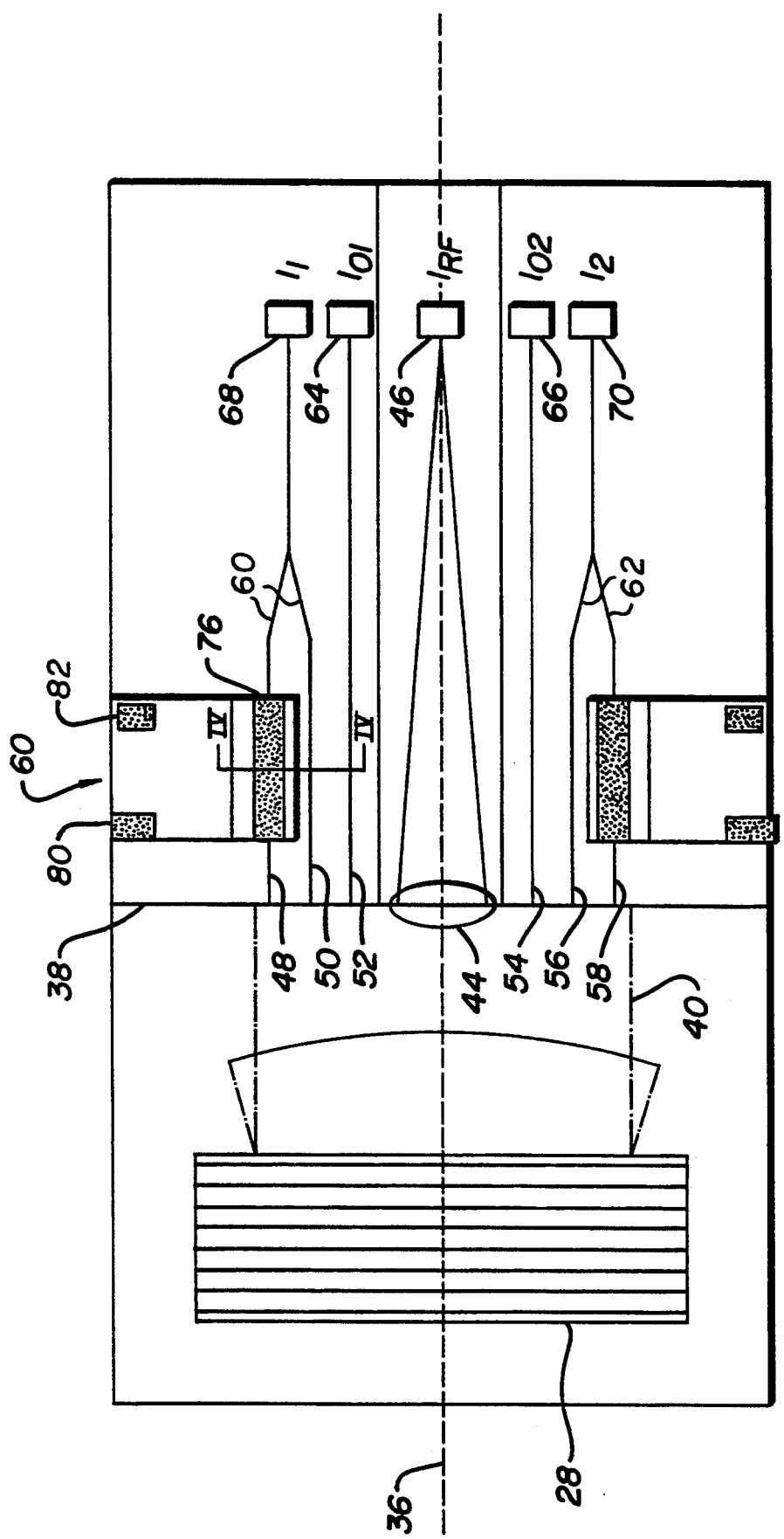
FIG. 3 is a plan view of the waveguide portion of the pick-up head illustrated in FIGS. 1 and 2.

Referring to FIG. 3, the device 10 is symmetric about the optical axis 36 and the planar waveguide 30 is modified beyond line 38. Beyond line 38, the beam 40 in waveguide 30 is coupled into discrete channels formed in the planar waveguide 30 either by ion milling, ion diffusion (in the case of $LiNbO_3$), or ion exchange techniques. The center portion of beam 40 is coupled into center channel 42. This channel is wide enough (i.e., 1–5 mm wide) that light propagates as a free wave in the transverse direction in this region and is focused by waveguide lens 44 onto waveguide photodetector 46. The temporal variation of the output photocurrent of detector 46, $I_{RF}$, is a direct measure of the data recorded on the optical disk 12 (the so-called "rf" signal).

The outer portions of beam 40 are coupled into channel guides 48, 50, 52, on one side of center guide 42, and 54, 56, and 58 on the other. Single mode channel waveguide pairs 48, 50 and 56, 58 form two M-Z interferometers 60, 62 that are disposed symmetrically about center channel 42. These single mode channels are typically 0.5 to 5 microns wide. Photocurrents $I_{01}$ and $I_{02}$ that are measured at the ends of waveguide channels 52 and 54 by photodetectors 64, 66 serve as reference signals for the two interferometers 60, 62. Furthermore, the difference in these two photocurrents provides the tracking error signal, $I_{TES} = I_{02} - I_{01}$. The reference channels 52 and 54 need not necessarily be single mode waveguides and can be 0.5 micron to 1 $\mu$m wide. All photodetectors 46, 64, 66, 68, 70 can be integrated into the silicon when silicon is chosen as the substrate 32.

At least a portion of waveguide channels 48 and 58 are formed of or are in proximity to electro-optic organic or inorganic materials. An example of an organic material is poled PMMA/azo-benzene sulfone dye co-polymer. An example of an inorganic material would be $LiNbO_3$.

Figure 4:
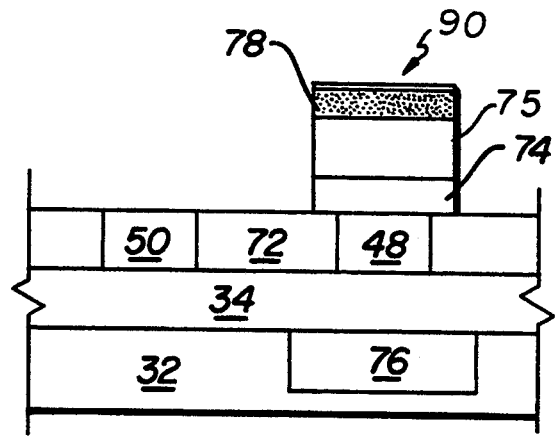
FIG. 4 is a diagrammatic sectional view taken along line IV—IV of FIG. 3.
Figure 5:
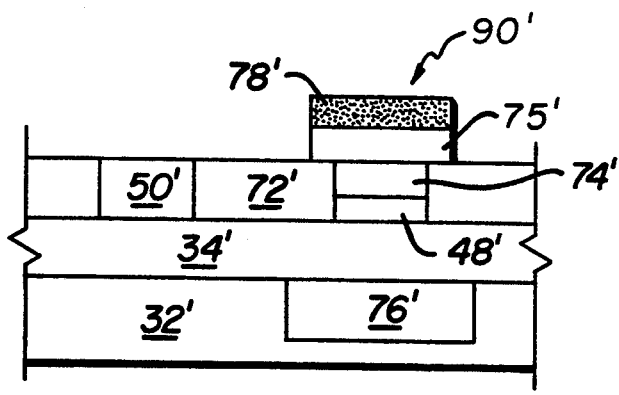
FIG. 5 is a sectional view similar to FIG. 4, but illustrating another preferred embodiment.
Figure 6:
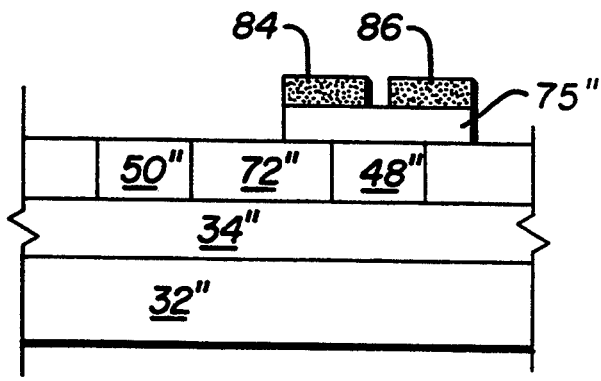
FIG. 6 is a sectional view similar to FIGS. 4 and 5, but illustrating another preferred embodiment.

FIGS. 4–6 illustrate means of incorporating electro-optic material in or on channel waveguides formed by the ion exchange process. These diagrams represent cross-sectional views through section IV—IV in FIG. 3. In these FIGS. 72 represents the non-guiding (lower index) glass, 48 and 50 represent the guiding (higher index) ion-exchanged glass channels. Channel waveguides formed by other techniques can also be used. FIG. 4 shows a means of incorporating an organic electro-optic material by depositing the material in a thin film 74 directly on top of waveguide channel 48. Alternatively, a portion of channel 48 could be removed by ion-milling or reactive ion etching and filled with the organic NLO material as shown in FIG. 5. Suitable electro-optic polymers are those which exhibit a high second order polarization susceptibility greater than about $10^{-9}$ electrostatic units, such as the polymers disclosed in U.S. Pat. Nos. 4,792,208; 4,948,225 and 4,955,977, the disclosures of which are incorporated herein by reference. In the embodiments shown in FIGS. 4 and 5, the light guided in the channel waveguides 48 and 48', respectively, interact with the nonlinear optic organic polymer films 74 and 74', respectively, by virtue of the fact that the index of refraction of the polymer films are equal to or slightly greater than the index of refraction of the material forming the channel waveguides 48 and 48'. The thicknesses of the polymer films are chosen so that the channel waveguides 48 and 48' remain single mode throughout the phase shifter region 90 and 90', respectively.

A pair of electrodes 76, 78 (FIGS. 3–5) are disposed on either side of NLO layer 74. These electrodes are provided to apply an electric field across the electro-optic material. This electric field is used to pole the organic electro-optic material as well as to generate the electrically-induced index of refraction change after polling is complete. Polling of the organic nonlinear optic polymer is accomplished by heating the polymer to a temperature just below its glass transition and applying an electric field. The polymer is cooled to ambient temperature with the field applied, after which time the yield is removed. In the embodiments shown in FIGS. 4 and 5, the polymer films 74 and 74', respectively, would be poled along an axis which is perpendicular to the planes of the substrates 32 and 32', respectively. In these embodiments, TM-polarized guided modes, corresponding to modes polarized along the axis of poling, would be utilized in order to obtain the largest electro-optic effect. If the substrate 32 or 32' is silicon, the lower electrode 76 or 76' can be formed by a P+ doped region of the silicon substrate 32 or 32' to which ohmic contact is made. Connection to external drive voltage is made via contact pads 80 and 82 (FIG. 3). Transparent buffer layers 75, 75' or 75" and 34, 34' or 34" serve to optically isolate the channel waveguide and NLO film from the metal electrodes. Buffer layer 34,34' or 34" can be a thin film 1 to 3 μm thick of thermally grown or sputtered $SiO_2$ and buffer layers 75, 75' or 75" can be a spin-coated layer 0.5 to 3.5 μm thick of a low index polymer such as polymethlymethacrylate.

FIG. 6 shows an alternative means of applying electrodes 84, 86 that is appropriate for Ti-exchanged $LiNbO_3$ channel waveguides. Electrodes 84 and 86 are positioned on either side of Ti-exchanged channel 48" on a transparent buffer layer 75". The buffer layer 75" serves to optically isolate the channel guide 48" from the metallic electrodes 84, 86. When a control voltage is applied across the electrodes, electric fringing fields in the region between the electrodes generate the index change in the electro-optic material. In the embodiment shown in FIG. 6, the orientation of the $LiNbO_3$ substrate is such that the crystallographic Z-axis is parallel to substrate 32" and perpendicular to the propagation direction of the light. The fringing fields of electrodes 84 and 86 are then parallel to the crystallographic z-axis in the vicinity of channel waveguide 48" and TE-polarized modes are utilized to obtain the largest electro-optic effect. The surface electrode configuration shown in FIG. 6 can also be used with organic electro-optic polymer waveguides as well. In this case the electrodes 84 and 86 would be used to pole the organic polymer as described previously. However the poling axis would be parallel to the substrate 32" and it would be necessary to utilize TE-polarized modes in order to obtain the largest electro-optic effect. The embodiment shown in FIG. 6 can also be adapted for use with TM-polarized modes simply by placing one of the two electrodes 84 or 86 directly above channel waveguide 48" and the other electrode to the side of the channel. Providing that electrodes 84 and 86 are spaced far enough apart with respect to the thickness of buffer layer 75", the fringing fields in the vicinity of channel waveguide 48" will be perpendicular to the plane of substrate 32" as would the poling axis of the electrically poled polymer. In the case of the $LiNbO_3$-based device, the crystallographic z-axis would also be oriented perpendicular to substrate 32".

The electro-optic phase modulator 90, 90' or 90" permits adjustment of the retardation of the light passing through this arm of the interferometer. This phase adjustment is useful to bias the operating point of the interferometer to a linear region. A similar modulator is formed on waveguide channels 48 and 58.

As shown in FIG. 3, guided beam 40 propagates with a straight or curved wavefront according to whether the disk 12 is in or out of focus. Wavefront curvature results in a phase difference between portions of beam 40 that couple into adjacent branches of the two M-Z interferometers 60, 62. An interference signal is generated by this phase difference. Consequently, $$I_{FES} = \frac{I_2}{I_{02}} - \frac{I_1}{I_{01}}$$

is generated that is related directly to the defocus, $\Delta$, which is the displacement of the disk from the nominal location The disk is nominally located one focal length away from the objective lens 14 in FIGS. 1–2. Defocus, $\Delta$, is indicated by the displacement arrows 24 in FIGS. 1–2. Normalization of signals $I_2$ and $I_1$ by the reference signals $I_{02}$ and $I_{01}$, respectively, compensates for light level changes due to causes such as fluctuations in the laser diode output, variation in grating coupling efficiency as the light goes in and out of focus, and rf signal modulation.

Figure 9:
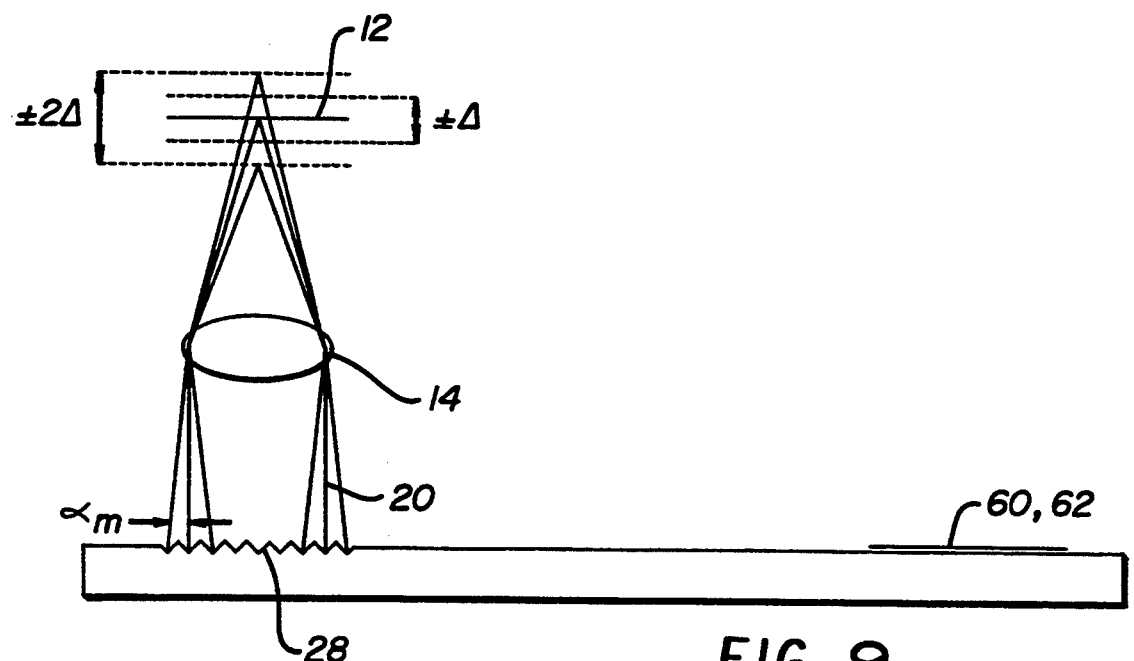
FIG. 9 is a diagrammatic side view of the objective lens, waveguide pick-up head and optical disk of FIGS. 1 and 2 illustrating the effects of optical disk motion on the collimation of the beam returning to the IGWOH from the objective lens.
Figure 10:
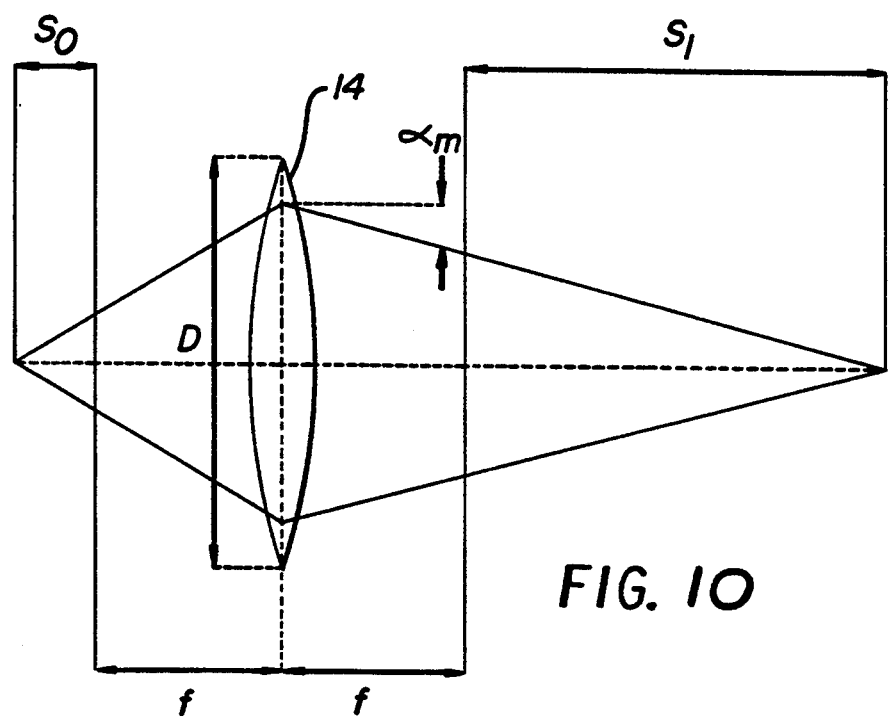
FIG. 10 is a side view of the objective lens of FIG. 9 illustrating the location of the image and object planes.

FIGS. 9–12 illustrate the operational principles of an IGWOH. FIG. 9 is a side-view of the IGWOH along with the optical disk and objective lens. An expression relating the vertical disk displacement (defocus, $\Delta$) to the signal detected in the M-Z interferometer can be derived. When the disk surface is in the nominal position, one focal length from the objective lens, the light reflected from the disk is collimated by objective lens 14. However, if the disk is displaced by a distance $\pm\Delta$, light reflected from the disk appears to originate from an object plane which is located $\pm 2\Delta$ from the nominal position. The Newtonian form of the lens equation yields an expression relating the locations of the image and object planes (FIG. 10):

$$S_1 = \frac{f^2}{2\Delta},$$

where $S_1$ is the distance from the image plane to the back focal point of the objective lens, and f is the focal length of objective lens. The divergence angle, $\alpha_m$, of the marginal ray is approximated by $$\alpha_m \simeq \frac{D}{2(f + S_1)} = \frac{D\Delta}{f(f + 2\Delta)}$$

where D is the diameter of the objective lens. Rays other than the marginal ray have smaller divergence angles, $$\alpha = \frac{2\alpha_m r}{D}$$

where r is the radius of the ray in the objective lens exit pupil.

Figure 11:
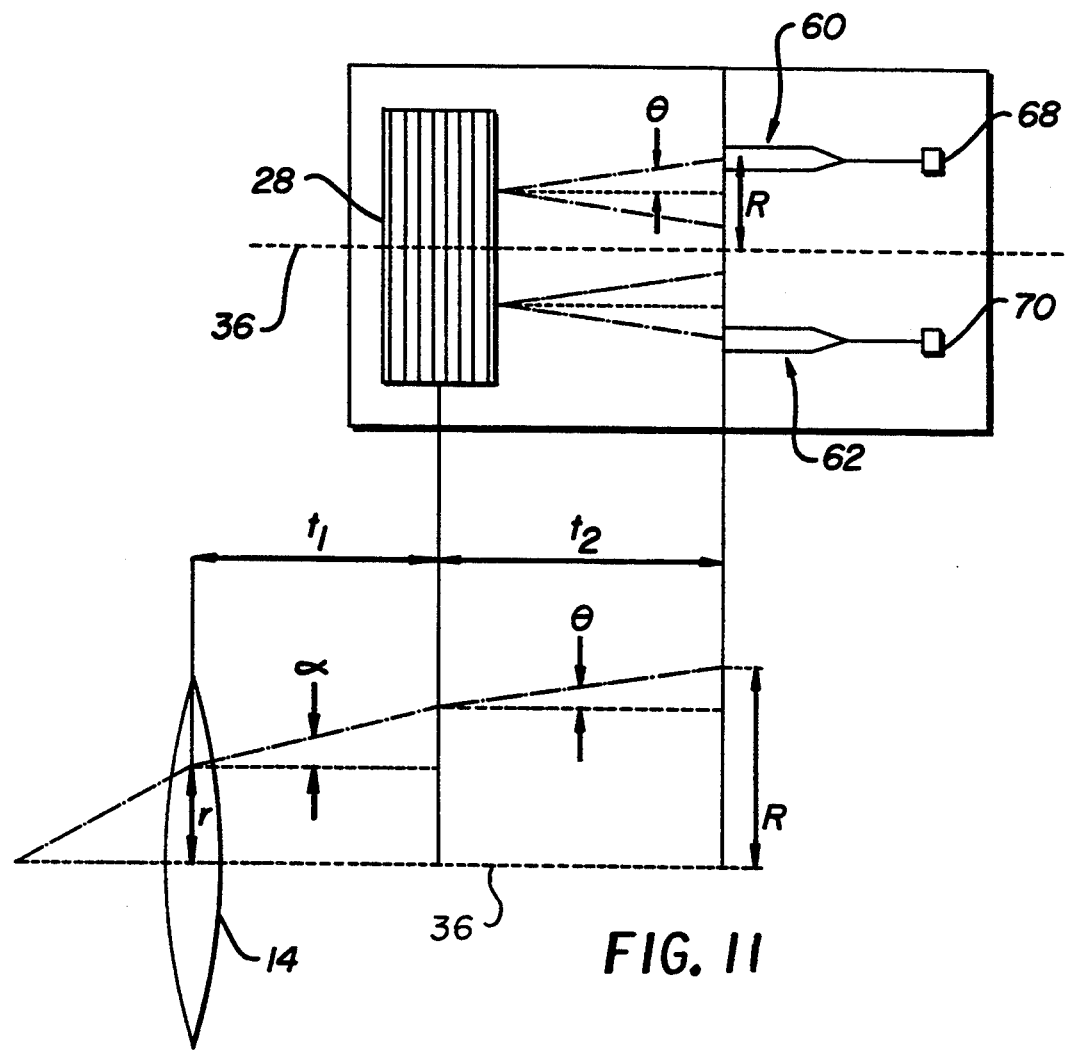
FIG. 11 is a diagrammatic top view of the waveguide device of FIG. 9 with an inset illustrating the optical axis unfolded so that the side view of the objective lens is coplanar with the waveguide device.

Light returning from the disk is coupled into the IGWOH by a grating coupler. The divergence angle in the waveguide, $\theta$, can be related to the angle $\alpha$ approximately by the expression $$\theta \simeq \frac{\alpha}{n_{eff}},$$

where $n_{eff}$ is the effective index of the guided mode (FIG. 11). Light in the planar waveguide portion of the head is coupled into two sets of channel waveguides that form a pair of M-Z interferometers. These interferometers are disposed symmetrically a distance R on either side of the optical axis.

Referring to FIG. 11, the following expression can be derived relating $\theta$ to $\Delta$ $$R \simeq r + \theta n_{eff}\left(t_1 + \frac{t_2}{n_{eff}}\right)$$

$$= \frac{\theta(n_{eff})f(2\Delta + f)}{2\Delta} + t_1 + \frac{t_2}{n_{eff}}$$

where $t_1$ is the distance between the objective lens and the grating coupler and $t_2$ is the distance between the grating coupler and the channel waveguides. Solving for $\theta$ yields $$\theta = \frac{\frac{2R\Delta}{n_{eff}}}{f(2\Delta + f) + 2\Delta\left(t_1 + \frac{t_2}{n_{eff}}\right)}$$

Figure 12:
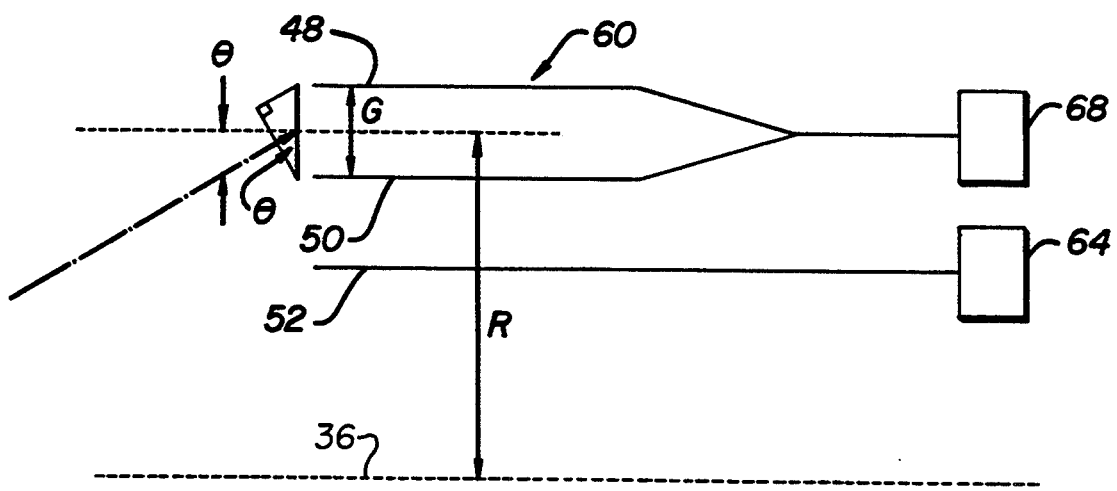
FIG. 12 is more detailed view of an individual MZ interferometer as shown in FIG. 11.

FIG. 12 is a detailed view of an individual M-Z interferometer. It can be seen that the relative optical path difference (OPD) between rays that are incident at an angle $\theta$ on the two adjacent channel waveguides that are joined at a Y-junction is given by the equation $$OPD = (n_{eff})(G\sin\theta) \cong (n_{eff})(G)(\theta)$$

where G is the separation between the two channel waveguides of the M-Z interferometer. The phase shift corresponding to this OPD is given by $$\Phi = \frac{2\pi}{\lambda} OPD$$

$$\cong \frac{\frac{2\pi G}{\lambda} 2R\Delta}{f(2\Delta + f) + 2\Delta\left(t_1 + \frac{t_2}{n_{eff}}\right)}$$

$$= \frac{2\pi G}{\lambda} \Delta \frac{2R}{f^2(1 + Q)}$$

where $$Q = \frac{2\Delta\left(t_1 + \frac{t_2}{n_{eff}} + f\right)}{f^2}$$

If Q is assumed to be negligible with respect to 1, the last equation above can be further simplified to $$\Phi \cong \frac{2\pi G}{\lambda} \frac{2R}{f^2} \Delta.$$

In this approximation, the phase shift is linear in the disk displacement.

The intensity of light exiting an individual M-Z interferometer can be specified in terms of the phase shift $\Phi$:

$$I_1 = I_{01}[1 + \cos(\Phi \quad \Phi_0)],$$

where $I_{01}$ is the intensity measured by the photodetector at the end of the straight reference channel guide, and $\Phi_0$ is the bias phase shift between light in the two parallel channels of the interferometer. 101 is the phase difference between rays arriving at the two parallel channel waveguides and is a function of the defocus, $\Delta$, as shown by the equation $$\Phi \cong \frac{2\pi G}{\lambda} \frac{2R}{f^2}.$$

If $\Phi_o$ is adjusted to be 90°, then $$, I_1 = I_{01}[1 + \cos(\Phi + \Phi_0)],$$

A bias shift of 90° is chosen so that positive and negative values of $\Delta$ can be distinguished by observing the sign of $I_1$.

Finally, when the second M-Z interferometer located on the opposite side of the optical axis is biased $-90°$ and the signal of one of the interferometers is subtracted from the other, a differential signal, $I_{FES}$, is obtained $$I_{FES} = \frac{I_2}{I_{02}} - \frac{I_1}{I_{01}}$$

$$= 2\sin(\Phi) \cong 2\sin\left[\frac{2\pi G}{\lambda} \frac{2R}{f^2}\right]$$

$$= 2\sin\frac{2\pi\Delta}{A}$$

where $$A = \frac{1}{\frac{G}{\lambda} \frac{2R}{f^2}} = \frac{\lambda f^2}{2RG}$$

Thus, $I_{FES}$ represents the focus error signal and varies sinusoidally with the defocus parameter, $\Delta$. By biasing the two M-Z interferometers $\pm 90°$ and taking the differential signal, two desired effects can be achieved simultaneously; namely, the DC level is suppressed and the output signal varies linearly with defocus (assuming $\Phi$ is much less than one radian). It will be appreciated that the $\pm 90°$ bias phase shift $\Phi_0$ can be generated electro-optically by applying a potential across the electrodes 76, 78 (FIG. 4); 76', 78' (FIG. 5); or 84, 86 (FIG. 6). Alternatively, a permanent bias phase shift can be introduced by adjusting the length of the modulator section 90, 90', or 90'' shown in FIGS. 4, 5, and 6, respectively. This adjustment could be accomplished during the manufacture of the device using laser trimming of the NLO organic polymer and buffer layers 74 and 75 in FIG. 3 or 74' and 75' in FIG. 4, or the buffer layer 75'' in FIG. 6.

The tracking error signal can be obtained from the differences in the reference signals:

$$I_{TES} = I_{02} - I_{01}$$

It will be appreciated that an undesirable side effect of the variation in grating coupling efficiency with defocus is that both $I_{TES}$ and $I_{FES}$ will be modulated by the defocus. Modulation components at frequencies below a few kHz can be eliminated from the high frequency data signal, $I_{RF}$, by passing this signal through high passband electrical filters. However, the frequency spectrum of $I_{TES}$ is the same as that of $I_{FES}$ so that electronic filtering of $I_{TES}$ is not an option. On the other hand, $I_{FES}$ could be used as an input signal to a variable-gain circuit which could compensate for the effects of defocus on $I_{TES}$.

As indicated, $I_{FES}$ is periodic in $\Delta$. FES signals in conventional optical heads are usually non-periodic. More specifically, the conventional FES signal is zero until the objective lens and disk surface are within ten microns or so of nominal separation. Within this range, the signal is positive on one side of focus, zero at focus, and negative on the other side of focus. The question arises as to whether the period of the proposed FES signal generation scheme can be made large enough so there will be no ambiguity in the control signal due to the periodicity. This question can be answered by considering the following numerical example wherein:

f = 4 mm
G = 20 μm
λ = 1 μmm
R = 1 mm
$n_{eff}$ = 1.5
$t_1$ = 2 mm
$t_2$ = 5 mm

Using these values for the various input parameters, the period, A, of the M-Z-interferometer signal can be calculated directly using the definition of A.

$$A = \frac{\lambda f^2}{2RG}$$

The maximum excursion range, $\pm\Delta_{max}$, over which ambiguity due to periodicity is avoided is given by $$\pm\Delta_{max} = \pm\frac{A}{4} = \pm\frac{\lambda f^2}{8RG} = \pm 100 \text{ microns.}$$

This range is large enough to avoid ambiguity for typical optical disk defocus ranges.

The quantity $\Delta_{max}$ can easily be made smaller by increasing either R or G. The shorter period of the FES signal increases the sensitivity of the device to defocus. Advantage may be taken of this fact to obtain a device to measure the FES over both coarse and fine ranges of defocus.

Of course, $\Delta_{max}$ can also be made larger by decreasing R or G, but larger values of $\Delta_{max}$ will affect the validity of the linear approximation, $$\Phi \approx \frac{2\pi G}{\lambda} \frac{2R}{f^2} \Delta.$$

This can be demonstrated by computing the parameter Q using the input parameters given above, $$Q = \frac{2\Delta_{max}\left(t_1 + \frac{t_2}{n_{eff}} + f\right)}{f^2} = 0.12,$$

which is much less than 1 and justifies the use of the linear approximation, $$\Phi \approx \frac{2\pi G}{\lambda} \frac{2R}{f^2} \Delta,$$

On the other hand, if R is taken to be 0.25 mm, $\Delta_{max}$ increases to 400 microns and Q becomes 0.47. Although Q is still less than 1, the equation, $$\Phi = \frac{2\pi G}{\lambda} \frac{2R}{f^2(1+Q)} \Delta,$$

should really be used to determine $\Phi$. In this case, $\Phi$ is no longer linear in $\Delta$.

Figure 7:
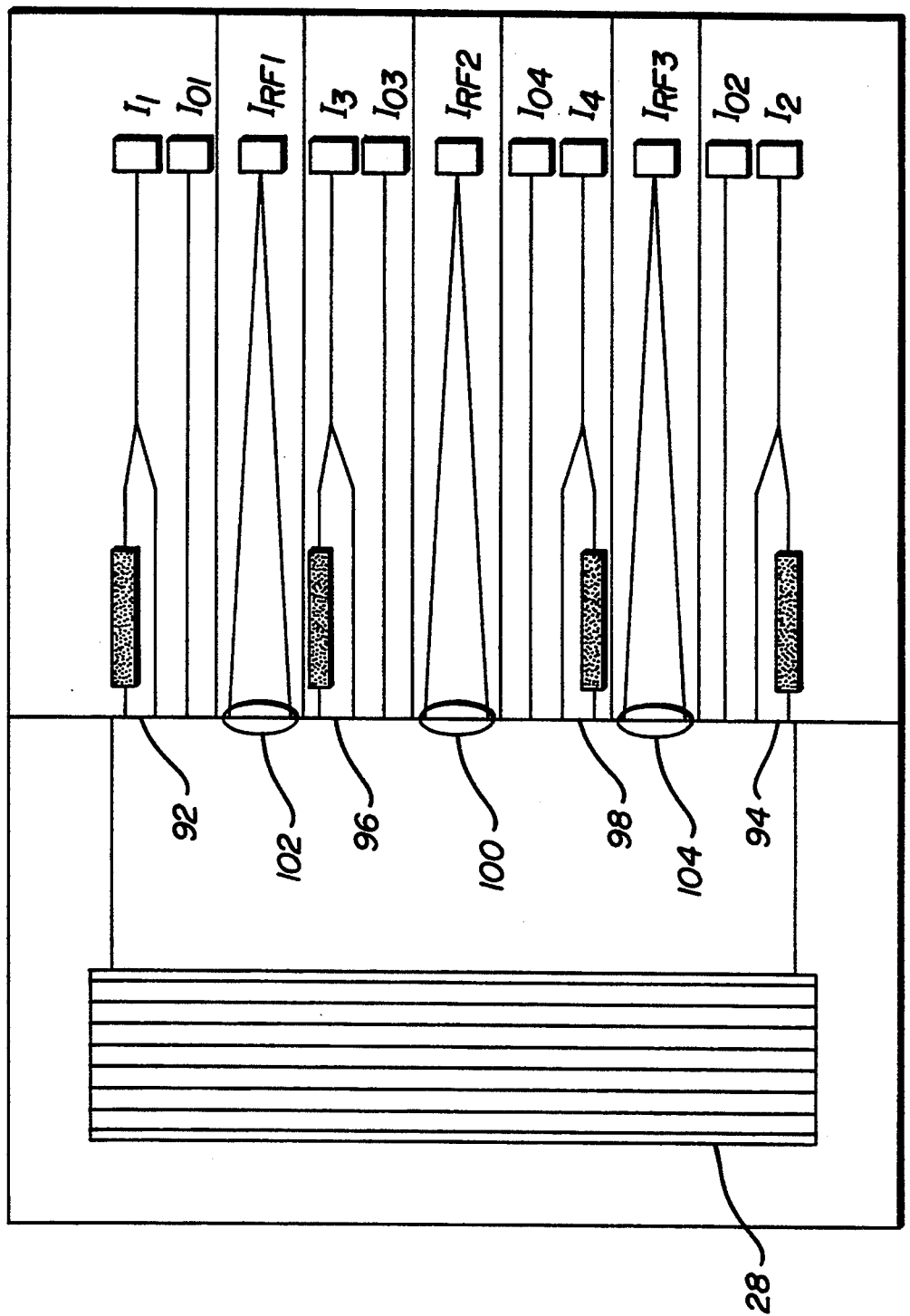
FIG. 7 is a diagrammatic plan view similar to FIG. 3, but illustrating another preferred embodiment with multiple interferometers.

Referring to FIG. 7, light returning from the optical disk 12 is coupled into the planar waveguide 30 by means of grating coupler 28. This alternative embodiment differs from the embodiment of FIG. 3 in that four M-Z channel waveguide interferometers 92, 94, 96 and 98 are used instead of two interferometers, and three waveguide lenses 100, 102 and 104 are used instead of one lens. The outer two M-Z interferometers 92, 94 are characterized by a different defocus excursion range, $\Delta_{max}$, from the inner two interferometers 96, 98. This is achieved by varying the RG product for the inner two interferometers 96, 98 relative to the outer two interferometers 92, 94. The coarse FES (small RG) is obtained from $$I_{FES,c} = \frac{I_4}{I_{04}} - \frac{I_3}{I_{03}}$$

and the fine FES (large RG) is obtained from $$I_{FES,f} = \frac{I_2}{I_{02}} - \frac{I_1}{I_{01}}.$$

The TES is given simply by $$I_{TES} = (I_{04} + I_{02}) - (I_{03} + I_{01}),$$

and the RF signal is given by $$I_{RF} = I_{RF1} + I_{RF2} + I_{RF3}.$$

Additional pairs of M-Z interferometers could be included for other excursion ranges.

Figure 8:
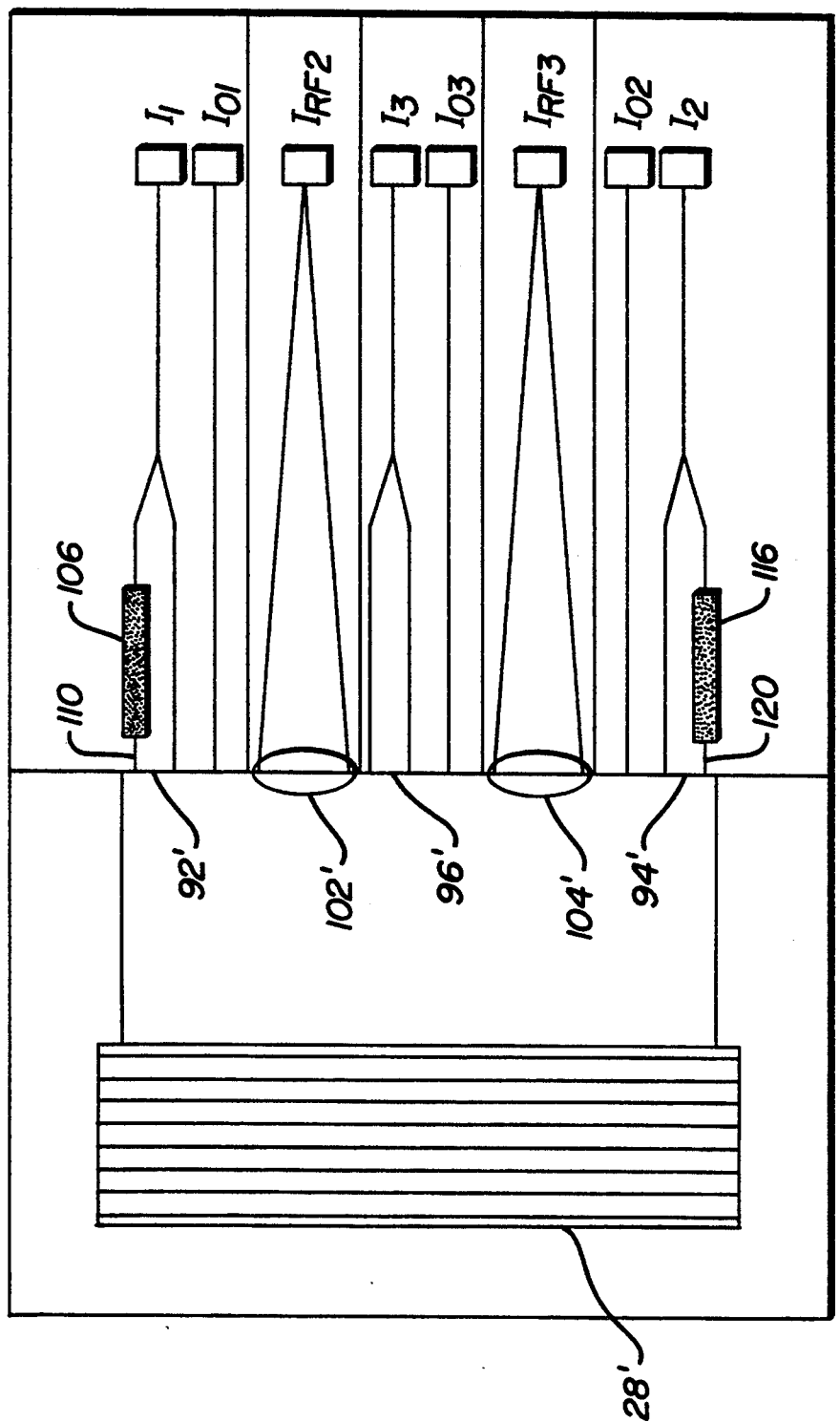
FIG. 8 is a plan view similar to FIGS. 3, and 7, but illustrating another preferred embodiment.

Normally, M-Z interferometers are sensitive to wavelength shift. This poses a serious difficulty if a semiconducting laser diode is used as a source because of wavelength shifts associated with longitudinal mode hops in most laser diodes. Another embodiment is illustrated in FIG. 8 that is self-correcting with respect to laser diode wavelength shift. A central M-Z interferometer 96' is positioned along the optical axis of the device. As in the fundamental embodiment, electrodes 106, 116 are deposited on electro-optic channel guides 110, 120 that form the variable-phase arms of two outer M-Z interferometers 92', 94', respectively. The counter electrodes for these phase modulators are positioned below the electro-optic channel guides. These channel waveguide phase-modulators permit dynamic alteration the bias phase shift. Because the portion of the wavefront incident on the central M-Z interferometer 96' is always planar, the output signal of the interferometer, $$I_{FB} = \frac{I_3}{I_{03}},$$

provides an independent measure of the wavelength shift. Detection of this signal level can be used to generate control voltages which, when applied to electrodes 106, 116, permit adjustment of the bias phase shifts of the two M-Z interferometers 92', 94', thereby compensating for wavelength shifts.

It can now be appreciated that there has been presented an integrated guided wave optical head for reading information from optical data storage disks, and a method for detecting the focus and tracking errors in the optical head.

The IGWOH uses Mach-Zehnder interferometer wavefront sensor apparatus to determine the focus and tracking errors. The present invention provides multiple pairs of MZ interferometers with each interferometer exhibiting a different sensitivity to defocus to permit readout of the FES over a variety of sensitivity ranges, and with each interferometer providing feedback to compensate for wavelength shift. The present invention uses newer technology and has waveguides formed from new thin-film electro-optic polymers deposited on silicon substrates, and integrates electronic functions such as photodetection, amplification, and switching with the optic functions.

The methods for determining focus and tracking errors in the IGWOH of the present invention comprises several steps common to both focus and error tracking. The common steps include forming channels in the optical head and forming first and second interferometers, detecting light emanating from the first and second interferometers, detecting light emanating from a first channel waveguide associated with the first interferometer, and detecting light emanating from a second channel waveguide associated with the second interferometer.

For determining tracking error, the method includes subtracting light detected by the first channel waveguide detector from light detected by the second channel waveguide detector. For determining focus error, the method includes obtaining the difference in the ratios of the light emanating from the interferometers divided by the light emanating from the respective channel waveguides.

The present invention is a novel integrated optic head comprised of a planar waveguide, channel waveguides, a waveguide condensing lens, and integrated waveguide photodetectors. The beam returning from the disk is coupled into the planar optical waveguides by a grating coupler. The main portion of this beam is focused by the waveguide condensing lens onto an integrated waveguide photodetector to provide the data signal. A smaller portion of the beam is sampled by channel waveguide MZ interferometers. These interferometers measure the beam wavefront curvature to provide the focus error signal (FES). Additional channel waveguides provide reference signals for the interferometers and provide a means of measuring the tracking error signal (TES). Compensation for light level fluctuations in TES is provided by normalization with the reference channels. Compensation in FES and RF signals is provided by electronic feedback from the MZ interferometers and by electronic filtering, respectively.

While the invention has been described with particular reference to an integrated optical head, it will be understood by those skilled in the art that various changes may be made and equivalents may be substituted for elements of the preferred embodiments without departing from invention. In addition, many modifications may be made to adapt a particular situation and material to a teaching of the invention without departing from the essential teachings of the present invention.

Because the condensing lens is the only waveguide lens required the integrated optic head is tolerant to manufacturing errors. The alignment and quality of the waveguide lens can be relatively coarse compared to the lens and alignment requirements of other focus error sensing lenses. In addition, the channel waveguides that constitute the MZ interferometers can be electro-optically tuned or laser trimmed after fabrication. The net result is that the integrated optic head is far more easily mass manufactured because of its reduced sensitivity to fabrication error.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A method for determining a focus error in an integrated optical head having an optical axis and being capable of reading from an optical data storage disk, comprising:
    forming channels in said optical head and forming a first and second interferometers equally spaced a first distance from said optical axis;
    detecting light emanating from said first and second interferometers;
    detecting light emanating from a first channel waveguide associated with said first interferometer;
    detecting light emanating from a second channel waveguide associated with said second interferometer;
    obtaining a fine focus error signal by obtaining the difference in the ratios of the light emanating from the first and second interferometers divided by the light emanating from the respective first and second channel waveguides; and
    compensating for the focus error using said fine focus error signal in the reading of the optical data storage disk.

2. A method, as set forth in claim 1, including: forming third and fourth interferometers equally spaced a second distance from said optical axis with said second distance being smaller than said first distance;
    detecting light emanating from said third and fourth interferometers;
    detecting light emanating from a third channel waveguide associated with said third interferometer;
    detecting light emanating from a fourth channel waveguide associated with said fourth interferometer;
    obtaining a coarse focus error signal by obtaining the difference in the ratios of the light emanating from the third and fourth interferometers divided by the light emanating from the respective third and fourth channel waveguides; and
    compensating for the focus error using said coarse focus error signal in the reading of the optical data storage disk.

3. A method, as set forth in claim 1, including forming at least a portion of the first and second channel waveguides of an electro-optic organic material.

4. A method, as set forth in claim 3, wherein said electro-optic organic material is a polymer exhibiting a high second order polarization susceptibility: and
    including the step of applying an electric field across the polymer and electrically polling the polymer.

5. A method as set forth in claim 4, including electrically inducing a change of refractive index in said polymer after polling.

6. A method for determining a focus error in an integrated optical head having an optical axis, comprising:
    forming channels in said optical head and forming a first and second interferometers equally spaced a first distance from said optical axis;
    detecting light emanating from said first and second interferometers; detecting fight emanating from a first channel waveguide associated with said first interferometer;
    detecting light emanating from a second channel waveguide associated with said second interferometer;
    obtaining a fine focus error signal by obtaining the difference in the ratios of the light emanating from the first and second interferometers divided by the light emanating from the respective first and second channel waveguides; and compensating for the focus error using said fine focus error signal in the reading of the optical data storage disk.

7. A method, as set forth in claim 6, including forming at least a portion of the first and second channel waveguides of an electro-optic organic material.

8. A method, as set forth in claim 7, wherein said electrooptic organic material is a polymer exhibiting a high second order polarization susceptibility; and
including the step of applying an electric field across the polymer and electrically polling the polymer.

9. A method, as set forth in claim 8, including electrically inducing a change of refractive index in said polymer after polling.

* * * * *